Oct. 31, 1967    W. I. STRAUSS ETAL    3,349,748
INDICATOR
Filed Oct. 7, 1964    3 Sheets-Sheet 1
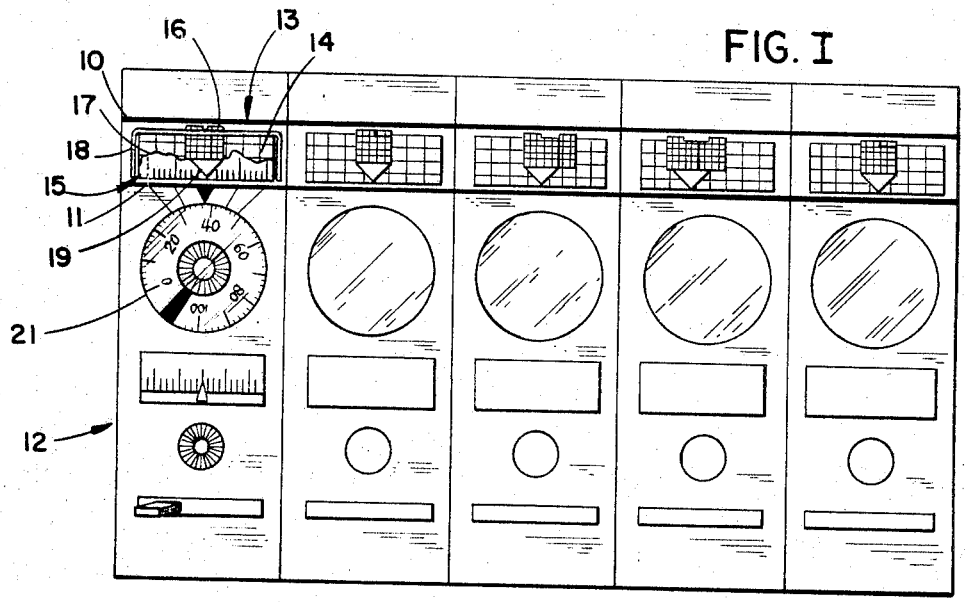
FIG. I
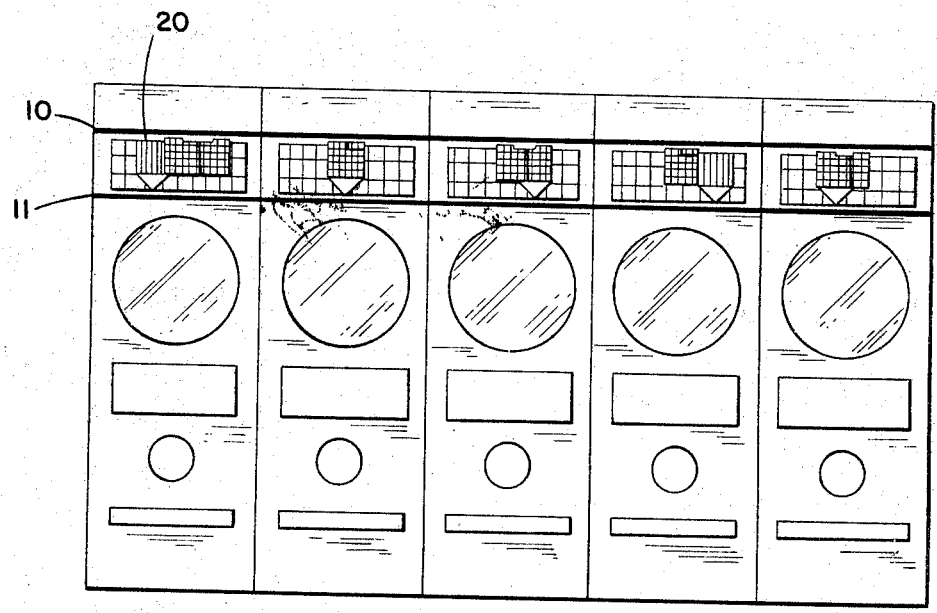
FIG. II
INVENTOR.
WILLIAM I. STRAUSS
RICHARD B. NEWELL
BY
AGENT

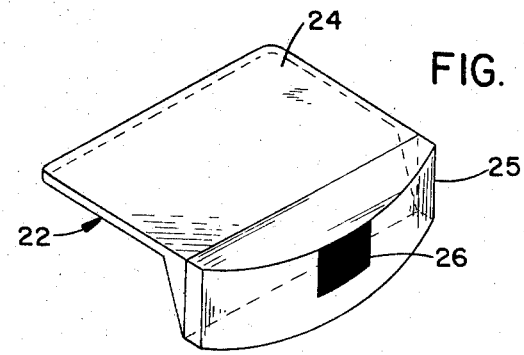
FIG. III
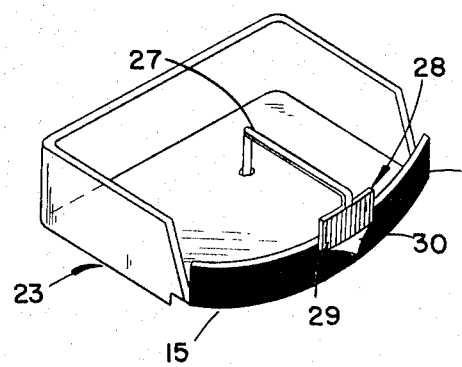
FIG. IV
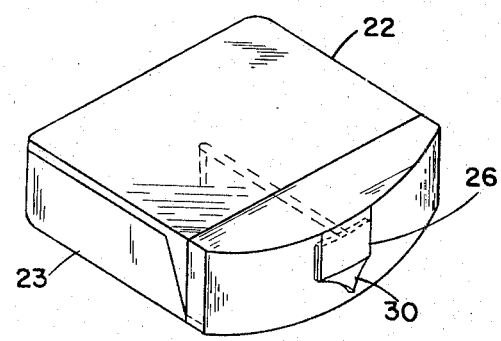
FIG. V
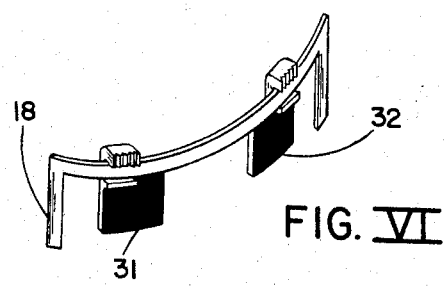
FIG. VI

Oct. 31, 1967
W. I. STRAUSS ET AL
3,349,748
INDICATOR
Filed Oct. 7, 1964
3 Sheets-Sheet 3
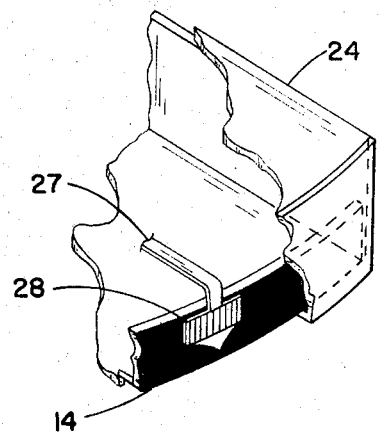
FIG. VII
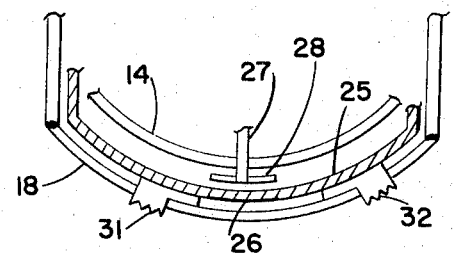
FIG. VIII
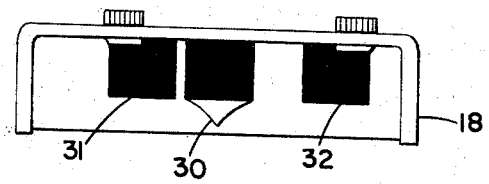
FIG. IX
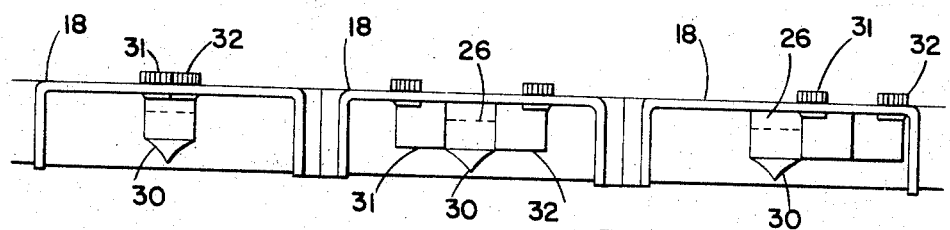
FIG. X
INVENTOR.
WILLIAM I. STRAUSS
RICHARD B. NEWELL
BY
Lawrence H. Fallon
AGENT

United States Patent Office 3,349,748
Patented Oct. 31, 1967

3,349,748
INDICATOR
William I. Strauss, Norwood, and Richard Bruce Newell, Attleboro, Mass., assignors to The Foxboro Company, Foxboro, Mass., a corporation of Massachusetts
Filed Oct. 7, 1964, Ser. No. 402,206
1 Claim. (Cl. 116—129)

This invention relates to industrial instrumentation, and has particular reference to indicator means in such instrumentation.

Modern instrument requirements have resulted in panel arrangements of many instruments together, such that many condition variants can be monitored at a particular location.

In the case of indicators, there are often groupings of identical units, each representing a different variable, ganged together. With such indicators relatively small and close together, visual discovery of a condition change can be easily missed by an operator.

This invention provides means for instant visual determination of the status of any or all of a group of such indicators.

Each indicator unit is provided with a horizontal, white indicator strip which lines up with all other such indicator strips in a horizontal line grouping of such indicator units. Centrally within each such strip, also horizontally disposed, is a black, indicator background strip. An indicator arm red end is movable horizontally along the background strip, and, usually centrally of the background strip as a norm position, an opaque black shield is located in front of the strip, to hide the red end at said norm position.

Accordingly, in this invention, the monitoring eye can simply scan a horizontal line through many indicator units. If no red is visible, all are at the norm. If one of the indicators is off norm, the red indicator appears from behind its shield, and is instantly apparent by a single, straight line horizontal scan for each horizontal grouping of indicator units.

Particular structure is provided to achieve this result according to this invention, including adjustable shield means.

It is an object of this invention to provide new and useful instrument indicator means.

Other objects and advantages of this invention will be in part apparent and in part pointed out hereinafter in the accompanying drawings, wherein:

FIGURES I and II are frontal outlines of horizontal groupings of indicator units according to this invention, illustrating the horizontal line scanning feature of this invention, with illustrative different arrangements of indicator positions and shielding;

FIGURE III is a perspective of the top of an individual indicator housing;

FIGURE IV is a perspective of the main body of an individual indicator housing showing the indicator arm and tip;

FIGURE V is an assembly of FIGURES III and IV;

FIGURE VI is a variable shield unit for assembly in front of the structure of FIGURE V;

FIGURE VII is a cut-away showing of the structure OF FIGURE V;

FIGURE VIII is a partial plan view, in partial section, of the structure of FIGURE V plus the assembly of FIGURE VI;

FIGURE IX is a front elevation of the structure of FIGURE VIII; and

FIGURE X is an illustrative horizontal line-up of several structures according to FIGURE IX.

As an aid to the structure and operation of this invention, color may be used to guide the eye and to provide contrast in the indicating function. As one example, illustrated in the drawings, a white line of sight traversing several indicators contains individual black strips of background for the indicator flag, individual to each indicator unit, and following the same line of sight. A black opaque shielding arrangement is used to hide the indicator flag at a particular point such as a null point, a zero, or a set point. The indicator flag itself may have a main facing of bright red which appears from behind its shield to indicate deviation. The same indicator flag is provided with a lower small white triangular point which may be visible at all times for a close-up scrutiny.

Accordingly, in the drawings and in the specification the above example of color combinations is set forth as one example.

In FIGURES I and II each of the figures illustrates a series of indicator units in a horizontal alignment to show the main line of sight. Across the top of each is an indicator device with the indicator flag and shield shown in varying positions according to different needs as could occur in actual indicator situations. The indicator situations might be different for each. One unit may represent flow, the next pressure, and the next temperature. Each unit may be set up for a different temperature. The set point might be different for each one and the actual condition existing at the moment of the illustration might result in the indicator flag being at the set point, or deviated therefrom. The variations in the showing of the upper line of sight indicator mechanisms in each unit thus illustrate possible different conditions specific to each unit.

In FIGURES I and II the line of sight is indicated by the white band between heavy, horizontal black lines 10 and 11. In each of the units, taking the first unit 12 as an illustration, there is a horizontal indicator assembly 13 whose details are further illustrated in FIGURES III and X and which includes a black background strip 14 with a line of white indicia markings horizontally along the bottom thereof as at 15.

A shield device is indicated at 16. This may be simply a fixed painted shield. Adjustment of shield coverage may be provided and it may be a combination of a fixed and an adjustable shield. This shield is black and the hatching at item 16 is shown smaller than that of background 14 to indicate both are black. The indicia 15 is white lines on the black background of the strip unit 14. The break line 17 is to show hatching to indicate that the strip is black, and at the same time to be able to show the indicia 15 along the bottom of the strip.

The adjustable shield unit 16 is mounted on an inverted U-shaped spring member 18, shown in more detail in FIGURE IV. This spring is mounted at its free ends at both ends of the indicator 13. It is mounted on the housing of the overall unit rather than on the indicator unit itself. This is illustrated in FIGURES VIII and X.

Each indicator flag is movable horizontally along its individual background strip 14 and the shield 16 is, in its adjustment, movable horizontally along the support bar 18. The indicator flag has a lower white inverted triangle tip 19 which extends below the shield 16 and is visible at all times.

As in FIGURE II, the indicator flag has a main indicator portion which is red, as at 20 in the first indicating unit of FIGURE II. It is here shown as having deviated from its norm to appear from behind its shield. Therefore the color red as at 20 is visible against the background of black. Ordinarily a scan across the top would show simply black and white and no red. It is interrupted by red only when there is a deviation of the indicator flag from the normal set point or zero or null balance position behind its shield.

In FIGURE I in the first unit 12, there is a showing of some of the other parts of an indicator unit of this nature. For example, there is a set point dial 21 for association with the indicator flag point 19 with indicia related to indicia 15 on the indicator background.

Thus with regard to FIGURES I and II it may be seen that the line of sight on an assembly of such indicator units is horizontal, a single straight line so that the eye follows along in scanning from a distance looking for trouble or alarm signals or information. Any deviation beyond the shielded area is registered in that same horizontal line, in the form of a red flag appearing from behind the shield in a horizontal movement. Thus a rapid scanning from a distance of an operator under whose care there may be be many of these units may very readily show that everything is normal and no action or alarm is necessary. If there is a deviation, the eye is caught by a red flag. Close scrutiny at any time shows the white bottom end tip of the indicator as related to the indicia line 15 and the set point or other reference dial 21. Thus this device provides a rapid scan at a distance strictly in a horizontal fashion while still providing means for close range scrutiny at any time.

The indicating unit which is used in each of the overall indicator devices, that is, the unit which appears within the line of sight and which is defined in front area essentially by the background 14, is shown in FIGURES III through V. FIGURE III shows a top 22, a main body 23 is shown in FIGURE IV, and FIGURE V is the assembly of these two.

The FIGURE III top is usually a metal plate as at 24 with a plastic front 25. The plastic front 25 is transparent and is provided with a permanent blacked-out portion 26 as a shield for an indicator flag. This shield is usually preferably horizontally centrally located and extends down from the top leaving room below it for the lower white end of the flag to be visible through the plastic. This plastic front fits over the front end of the housing 23 of FIGURE IV, underneath and over.

The housing 23 contains an indicator arm 27 extending up through the bottom thereof from any of the usual suitable indicator arm drive means (not shown) to extend forward to a point where a downward flag 28 is provided with a red main body 29 and a white lower tip 30.

The indicator arm 27 is arranged for pivotal movement such that the indicator flang 28 moves horizontally along the background strip 14 and with respect to the horizontal indicia 15.

The FIGURE V assembly showing thus indicates the main flag portion 28 hidden behind the shield 26 with the lower tip 30 of the flag showing thereunder.

FIGURE VI is a showing of the inverted U-spring bar 18 which is the support for adjustable shield members 31 and 32. These shield members are mounted so as to have a sliding horizontal movement on the support member 18. The shields are adjustable therealong in a horizontal arc corresponding to the front of the indicating unit to provide sensitivity control of the read out of the indicator. The spring is not mounted to the assembly of FIGURE V but to the housing within which that FIGURE V assembly itself is mounted.

The spring arm 18 is mounted by spot weld or other fashion at its lower free ends. It is spring biased against the plastic front of the housing of FIGURE V through the adjustable shield members 31 and 32. These members can be moved along to any desired position with reasonable ease and yet will maintain the position by the slight friction of their own assembly to the mounting 18, combined with the spring effect of the member 18 against the plastic housing in the front of the assembly of FIGURE V.

It may be noted that in FIGURES IX and X that these adjustable shields may be put together over the permanent shield, that is shield 26 of FIGURE III, so as to appear as one single shield. They may also be moved sideways as in FIGURE X to enlarge the permanent shield area on both sides, or to enlarge it on one side, or as in FIGURE IX to be simply set up laterally at will to indicate and cover other different points along the indicators at which the flags might desirably be hidden.

FIGURE VII is a breakaway detail of the assembly of FIGURE V. FIGURE VIII is a showing of the whole front of the assembly with the indicator background 14, the indicator arm 27, the flag 28, the plastic cover 25, the shield support spring 18, the adjustable shields 31 and 32, and the permanent shield indicated as a heavier line as at 26.

This invention therefore provides a new and improved form of indicator instrument.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

We claim:

Industrial instrument indicator means comprising an open top indicator housing, an indicator background strip forming the front wall of said housing, said background strip being curved as defined by a horizontal radius about a center point within said housing, an indicator arm within said housing and operable as said radius about said center, an indicator element depending from said arm and lying in front of said background strip for movement horizontally therealong as said indicator arm is pivoted about said center, a cover for said housing, a transparent depending front wall as part of said cover, with said cover front wall lying in front of said background strip and in front of said indicator element, a fixed, opaque shield portion provided in said cover front wall behind which at least the greater part of said indicator element may be hidden as a norm location, a pair of adjustable, opaque shield members mounted in front of said depending front wall of said cover, for horizontal adjustment resulting in hiding different portions of said background strip, said adjustable opaque shield members, together with said fixed opaque shield, providing shield variants from the size of said fixed shield alone, to a shield made up of all three shields in series, side by side, and supporting means for said adjustable shields, mounted on said cover for holding said adjustable shields in front of said front wall of said cover, and by means of which said horizontal adjustment of said adjustable shields is accomplished.

References Cited

UNITED STATES PATENTS

| 1,878,035 | 9/1932 | Vickery | 116—129 |
| 2,209,670 | 7/1940 | Wait | 116—129 |
| 2,291,610 | 8/1942 | Crane | 116—129 |
| 2,984,204 | 5/1961 | White | 116—116 |

FOREIGN PATENTS

| 927,220 | 5/1963 | Great Britain. |
| 593,455 | 3/1960 | Canada. |
| 281,259 | 6/1952 | Switzerland. |

LOUIS J. CAPOZI, *Primary Examiner.*